United States Patent
Jha et al.

(10) Patent No.: US 9,679,092 B1
(45) Date of Patent: Jun. 13, 2017

(54) CONSTRAINT HANDLING FOR PARAMETERIZABLE HARDWARE DESCRIPTION LANGUAGE

(71) Applicant: Xilinx, Inc., San Jose, CA (US)

(72) Inventors: Pradip K. Jha, Cupertino, CA (US); Ravi N. Kurlagunda, Fremont, CA (US); David A. Knol, Los Gatos, CA (US); Dinesh K. Monga, Santa Clara, CA (US); Stephen P. Rozum, Loveland, CO (US); Sudipto Chakraborty, Longmont, CO (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/931,650

(22) Filed: Nov. 3, 2015

(51) Int. Cl.
*G06F 17/50* (2006.01)

(52) U.S. Cl.
CPC ...... *G06F 17/5045* (2013.01); *G06F 17/5031* (2013.01); *G06F 17/505* (2013.01); *G06F 17/5022* (2013.01)

(58) Field of Classification Search
CPC ............ G06F 17/5045; G06F 17/5031; G06F 17/5022; G06F 17/505
See application file for complete search history.

(56) References Cited

U.S. PATENT DOCUMENTS

| | | | |
|---|---|---|---|
| 5,297,057 A * | 3/1994 | Kramer | G06F 17/5086 345/953 |
| 5,971,595 A * | 10/1999 | Grant | G06F 17/5045 716/103 |
| 6,175,949 B1 * | 1/2001 | Gristede | G06F 17/505 716/135 |
| 6,408,428 B1 * | 6/2002 | Schlansker | G06F 17/5045 716/104 |
| 6,857,110 B1 * | 2/2005 | Rupp | G06F 17/5045 326/44 |
| 7,093,208 B2 * | 8/2006 | Williams | G06F 17/505 365/149 |
| 7,236,918 B2 * | 6/2007 | Roesner | G01B 31/318364 703/13 |
| 7,353,488 B1 * | 4/2008 | Coffin | G06F 17/5045 707/999.1 |
| 7,526,745 B2 * | 4/2009 | Vergara-Escobar | G06F 17/5031 703/16 |
| 7,937,678 B2 * | 5/2011 | Lippmann | G06F 17/505 716/103 |
| 8,010,920 B2 * | 8/2011 | Bartolotti | G06F 17/505 716/104 |
| 8,032,852 B1 * | 10/2011 | Sinclair | G06F 17/5077 716/116 |
| 8,239,798 B1 * | 8/2012 | Goyal | G06F 17/5031 716/113 |
| 8,631,364 B1 * | 1/2014 | Dobkin | G06F 17/5045 716/100 |

(Continued)

*Primary Examiner* — Naum B Levin
(74) *Attorney, Agent, or Firm* — Kevin T. Cuenot (57) ABSTRACT

Constraint handling for a circuit design may include determining, using a processor, instances of parameterizable modules of a circuit design associated with constraints based upon a predefined hardware description language attribute within the instances, extracting, using the processor, parameter values from the instances of the parameterizable modules, and generating, using the processor, static constraint files for the instances of the parameterizable modules using the extracted parameter values.

20 Claims, 3 Drawing Sheets

(56) References Cited

U.S. PATENT DOCUMENTS

| | | | |
|---|---|---|---|
| 8,930,863 B2* | 1/2015 | Nayak | G06F 17/5081 716/104 |
| 2013/0144589 A1* | 6/2013 | Levi | G06F 17/5022 703/14 |
| 2014/0165022 A1* | 6/2014 | Stevens | G06F 17/5031 716/134 |
| 2015/0242541 A1* | 8/2015 | Cerny | G06F 17/5045 716/106 |

* cited by examiner

CONSTRAINT HANDLING FOR PARAMETERIZABLE HARDWARE DESCRIPTION LANGUAGE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This disclosure relates to circuit design and, more particularly, to handling constraints for parameterizable hardware description language.

BACKGROUND

Static timing analysis (STA) is a technique for computing the expected timing of a digital circuit. To perform STA, timing constraints must be specified for the digital circuit. A computer aided design tool may perform STA using the timing constraints to analyze the digital circuit and determine whether the digital circuit is able to operate correctly at a given clock frequency. STA may be performed in a variety of different contexts such as during circuit design if invoked by a user, during implementation as part of synthesis, placement, and/or routing, and the like.

One way of specifying timing constraints is by a user invoking a tool-specific command through which the user specifies one or more timing constraint file names. In order to use a particular parameterizable module of hardware description language such as cores or Intellectual Properties (IPs) in a circuit design, the user must determine which timing constraints are applicable to the parameterizable modules, create timing constraint files specifying the timing constraints for the parameterizable modules, and associate the various timing constraint files with the corresponding parameterizable modules in the circuit design. This is largely a manual and time consuming process subject to error.

Another way of specifying timing constraints is through the use of metadata. Metadata may be specified in IP-XACT format, which is an eXtensible Markup Language (XML) format that may be used to define and describe electronic components and their designs. The creation of metadata, however, is also a manual, error-prone process that requires significant knowledge of XML syntax. In many cases, hardware designers are unfamiliar with XML. This unfamiliarity may further complicate the creation and usage of timing constraints, thereby inhibiting usage of parameterizable modules.

SUMMARY

A method of constraint handling for a circuit design may include determining, using a processor, instances of parameterizable modules of a circuit design associated with constraints based upon a predefined hardware description language (HDL) attribute within the instances. The method may include extracting, using the processor, parameter values from the instances of the parameterizable modules and generating, using the processor, static constraint files for the instances of the parameterizable modules using the extracted parameter values.

A non-transitory computer-readable storage medium may include instructions stored thereon which, when executed by a processor, perform a method of constraint handling for a circuit design. The method may include determining, using a processor, instances of parameterizable modules of a circuit design associated with constraints based upon a predefined HDL attribute within the instances. The method may include extracting, using the processor, parameter values from the instances of the parameterizable modules and generating, using the processor, static constraint files for the instances of the parameterizable modules using the extracted parameter values.

A system may include a processor programmed to initiate executable operations for constraint handling for a circuit design as described herein.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to circuit design and, more particularly, to handling constraints for parameterizable hardware description language (HDL). In accordance with the inventive arrangements described within this disclosure, constraints for parameterizable HDL modules may be handled in a more efficient manner within an electronic design automation (EDA) system (system) thereby improving runtime performance of the system. For example, when performing any of a variety of operations, a system may need to use constraints of parameterizable HDL modules for a circuit design. The constraints may require evaluation, transformation into a static form, loading into program execution memory, and/or the like. The inventive arrangements described within this disclosure may reduce the time required to process these constraints thereby reducing runtime of the system.

Within a parameterizable HDL module, a user may set or otherwise specify the value of one or more parameters included therein. The constraints that may be associated with the parameterizable HDL module may also be parameterizable. For example, the value, or values, of a constraint and/or whether the constraint is even applied to a given instance of a parameterizable HDL module or cell thereof may be dependent upon the values assigned to one or more parameters of the instance of the parameterizable HDL module.

In one arrangement, constraint files may be specified as an ordered list using an attribute of the HDL used to specify the circuit design. Using HDL attributes, a designer may associate one or more constraint files with an HDL module in a native format. The system may detect the constraint files at runtime. Because the constraint files may be specified directly within the HDL source code, there is no need for a user to identify constraint files to the system using tool-specific commands and/or by writing scripts. Further, the user is relieved from having to create complex metadata to accompany each circuit design to specify which files contain the constraints for the circuit design.

As defined within this disclosure, the term "runtime," as applied to a circuit design, means performing an operation on a circuit design that involves usage of one or more constraint files. Examples of runtime, as applied to circuit designs, may include, but are not limited to, performing timing validation, performing static timing analysis, performing a design step of a design flow. Each of synthesis, placement, and routing is an example of a step of a design flow.

As defined herein, the term "hardware description language" or "HDL" is a computer-language that facilitates the documentation, design, and manufacturing of a digital system, such as an integrated circuit. An HDL combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, e.g., clocks and/or clock signals, which is a primary attribute of a digital system. Examples of HDLs may include, but are not limited to, Verilog and VHDL. HDLs are sometimes referred to as register transfer level (RTL) descriptions of circuit designs and/or digital systems. Both Verilog and VHDL support the ability to specify attributes on modules in their native syntax.

As defined within this disclosure, the term "circuit design" means one or more HDL modules. A circuit design may refer to an entire circuit design that includes user specified HDL; one or more cores and/or intellectual properties (IPs); a combination of user specified HDL, cores, and/or IP; a single IP and/or core (e.g., a reusable portion of HDL); or the like. As defined within this disclosure, the term "module" means a unit of HDL. A module is a defined construct within the syntax of the particular HDL that is being used.

As defined within this disclosure, a "parameterizable module" means a module that includes at least one parameter to which one of a plurality of different possible values may be assigned. As defined herein, the term "constraint" means a requirement for a portion of a circuit design that is observed or enforced by an EDA system. As defined herein, the term "parameterizable constraint" means a constraint that is dependent upon one or more values of parameters of a module to which the parameterizable constraint is to be applied.

The inventive arrangements described herein may be implemented as a method or process of handling constraints for parameterizable modules performed by a data processing system. In another aspect, the inventive arrangements may be implemented as a data processing system having a processor. The processor, upon executing program code, may be programmed to initiate executable operations relating to the handling of constraints for parameterizable modules. In still another aspect, the inventive arrangements may be implemented as a non-transitory computer-readable storage medium storing program code that, when executed, causes a processor and/or a system to perform and/or initiate a method or process relating to handling constraints for parameterizable modules.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
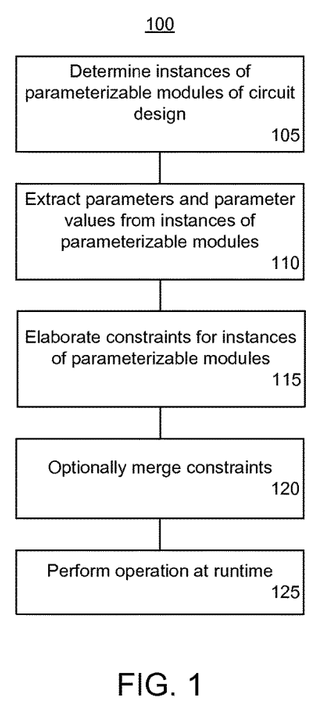
FIG. 1 is a flow chart illustrating an exemplary method of handling constraints for hardware description language modules.

FIG. 1 is a flow chart illustrating an exemplary method 100 of handling constraints for parameterizable modules. Constraints may include timing constraints. Method 100 may be implemented by a system, e.g., an EDA system. An example of a system suitable for implementing method 100 may be a data processing system such as a computer that executes suitable operational software such as EDA, circuit design, and/or circuit analysis software. Method 100 may be performed at runtime by the system. In one arrangement, method 100 may be performed in an entirely automated manner by the system without user intervention. For example, method 100 may be performed automatically responsive to a user input requesting a runtime operation.

Method 100 may begin in block 105 where the system may determine the instances of parameterizable modules of a circuit design. The circuit design may be expressed, or specified, as a plurality of modules. One or more of the modules may be parameterizable modules. Further, the circuit design may include one or more different instances of modules and/or parameterizable modules.

In one arrangement, a parameterizable module may include an attribute called CONSTRAINT_FILE. The attribute may be inserted within the instances of the parameterizable modules of the circuit design. For example, a designer of the parameterizable module may have inserted the attribute therein. The attribute may be a native HDL attribute included in a definition of the module. Inclusion of the CONSTRAINT_FILE attribute within a definition of a module indicates that the module is a parameterizable module. The CONSTRAINT_FILE attribute may specify the location of the constraints. For example, the CONSTRAINT_FILE attribute may specify the file that contains the constraints for a particular parameterizable module. The CONSTRAINT_FILE attribute may specify a path and/or partial path for the constraint file. As such, the constraint file specification is self-contained within the HDL. It should be appreciated that a predetermined formative other than "CONSTRAINT_FILE" may be used as the attribute indicating the constraint file for a given module. As such, the inventive arrangements are not intended to be limited to the use of one particular formative as the attribute.

The system may determine parameterizable modules of the circuit design by searching modules of the netlist hierarchy. The system may search each module for the existence of a CONSTRAINT_FILE attribute. In one aspect, the system may create a table of parameterizable modules and corresponding constraint files for the respective parameterizable modules as determined from the CONSTRAINT_FILE attribute(s).

Example 1 below illustrates exemplary HDL pseudocode for a definition of a parameterizable module called "xpm_cdc_single". In Example 1, the CONSTRAINT_FILE attribute specifies a value of "xpm_cdc_single.xdc". The value in this example is the file name of the constraint file that is associated with, and should be used for, the parameterizable module named "xpm_cdc_single". In this example, the directory may be presumed to be a current directory (e.g., a directory in which the parameterized module is located or a subdirectory thereof) or other default directory.

EXAMPLE 1

```
(* CONSTRAINT_FILE="xpm_cdc_single.xdc" *) //
    constraint file associated with the module xpm_
    cdc_single
#(
    // Common module parameters
    parameter MODE=0, // 0 for SYNC, 1 for ASYNC
    parameter DEST_SYNC_FF=4,
    parameter VERSION="REV1.0",
    parameter SRC_INPUT_REG=1)
)
(
    input src_clk,
    input src_in,
    input dest_clk,
    output dest_out)
);
...
endmodule
```

In block 110, the system may extract parameters and values of parameters (parameter values) from the instances of the parameterizable module(s) determined in block 105. In one arrangement, the system may extract the parameters and parameter values for each instance of a parameterizable module. The set of parameters and parameter values for an instance of a parameterizable module are used to define or characterize the behavior of that instance of the parameterizable module. The parameter values determine the behavior of the instance of the parameterizable module. Further, these parameters and parameter values may determine the constraints for the parameterizable module.

For example, the definition of the xpm_cdc_single parameterizable module of Example 1 includes four parameters named MODE, DEST_SYNC_FF, VERSION, and SRC_INPUT_REG. Example 2 below illustrates an exemplary instance of the xpm_cdc_single parameterizable module. Example 2 includes a value for each of the four parameters of the parameterizable module. A parameterizable module, for example, may include default values for parameters that may be overwritten according to user preference in a circuit design.

EXAMPLE 2

```
xpm_cdc_single # (
    // Common module parameters
    .MODE (1),
    .DEST_SYNC_FF (8),
    .VERSION ("REV1.0"),
    .SRC_INPUT_REG (1),)
) xpm_cdc_single_inst (
    // Common module ports
    src_clk (src_clk),
    src_in (src_in),
    dest_clk (dest_clk),
    dest_out (dest_out))
);
```

Subsequent to block 110, the system may determine the parameter values for the xpm_cdc_single parameterizable module as illustrated in Table 1 below. In one arrangement, the system may store the parameters and parameter values for each instance of the parameterizable modules in a table or other data structure in memory, whether persistent memory or non-persistent memory.

TABLE 1

| Parameter | Value |
|---|---|
| MODE | 1 |
| DEST_SYNC_FF | 8 |
| VERSION | "REV1.0" |
| SRC_INPUT_REG | 1 |

Figure 2:
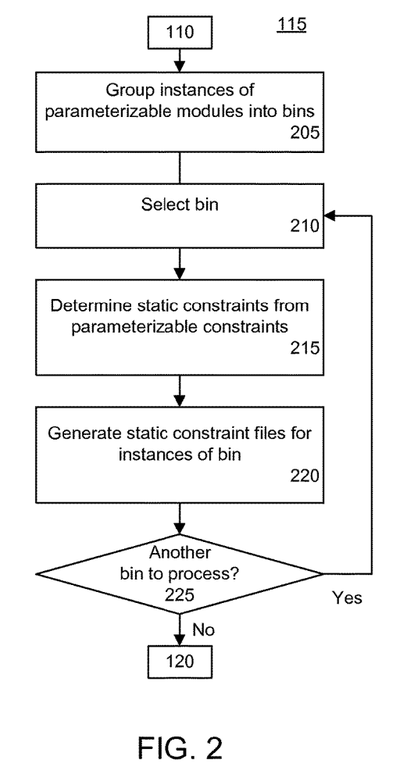
FIG. 2 is a flow chart illustrating an exemplary method of elaborating constraints.

In block 115, the system may elaborate constraints for the instances of the parameterizable modules. Elaboration refers to the process of generating a static constraint file for each instance of a parameterizable module of the circuit design. The static constraint files may be stored in non-volatile or persistent memory, e.g., on disk. The system may elaborate parameterizable constraints for the parameterizable modules according to the extracted parameters and parameter values determined in block 110. For example, the system may determine the static constraints for an instance of a parameterizable module and create multiple static constraint files having the same contents for multiple instances of a same parameterizable module. FIG. 2 provides a more detailed example of elaboration.

A constraint file may include one or more parameterizable constraints. In this regard, the constraint file may be dynamic in that the value of a parameterizable constraint such as a timing constraint may not be determined or calculated until runtime. For example, a parameterizable constraint within the constraint file may be specified as logic or other program code that the system may evaluate or execute at runtime. Example 3 illustrates an exemplary parameterizable constraint that may be included in a constraint file for a parameterizable module.

EXAMPLE 3

```
<: set MODE [getIntValue "MODE"]:>
<: if {$MODE} {:>
set_false_path -to [get_cells -hierarchical *syncstages_f-
f_reg[0]*]
<:}:>
```

The parameterizable constraint of Example 3 is dependent upon the parameter value of the MODE parameter discussed above in the xpm_cdc_single parameterizable module of Example 2. When the parameterizable constraint is evaluated at runtime, the line "set_false_path -to [get_cells -hierarchical *syncstages_ff_reg[0]*]" may survive as a constraint that is applied to an instance of the parameterizable module or may not survive and, as such, is not applied to the instance of the parameterizable module. Whether the parameterizable constraint survives and is applied is contingent upon the parameter value of the MODE parameter for a given instance of the parameterizable module.

Example 4 is an exemplary constraint generated by elaborating the parameterizable constraint of Example 3 using the parameter value "MODE=1" as illustrated in Table 1 for the constraint file.

EXAMPLE 4 set_false_path -to [get_cells -hierarchical *syncstages_ff_reg[0]*]

Referring to Example 4, the constraint file for the particular instance of the xpm_cdc_single parameterizable module having the parameter values shown in Table 1 has a single, static constraint after elaboration. Once elaborated, the constraint file may be referred to as a static constraint file. Constraint files may be specified on a per module basis. For example, the xpm_cdc_single module will have a constraint file of xpm_cdc_single.xdc as specified by the CONSTRAINT_FILE attribute. The constraint files may be specified on a per module basis for parameterizable modules, e.g., as a master constraint file for the parameterizable module. Elaboration generates a static constraint file for each instance of the xpm_cdc_single parameterizable module. The static constraint file for each instance of a parameterizable module is generated from the constraint file for the parameterizable module. The resulting static constraint files have static constraints that are determined from the parameter values for each respective instance of the xpm_cdc_single parameterizable module.

As such, a single constraint file including parameterizable constraints, e.g., dynamic, value dependent constraints, may be specified for a parameterizable module. The constraint file may be expanded to implement one static constraint file including static constraint(s) for each instance of the parameterizable module. The constraints included in each resulting constraint file are static and dependent upon the parameter values of the associated instance of the parameterizable module.

Parameterizable constraints provide users with increased flexibility since the constraints are parameter dependent. The value of a parameterizable constraint and whether the parameterizable constraint is applied to an instance of a parameterizable module may be dependent upon parameter value(s) of the particular instance of the parameterizable module being processed.

In block 120, the system may optionally merge static constraints. For example, the system may merge one or more static constraints into a merged static constraint. The system may merge static constraints across multiple instances of a same parameterizable module, across multiple different modules, and/or across one or more instances of two or more different parameterizable modules. The static constraints may be merged into a single, larger static constraint. In one aspect, static constraints may be merged across one or more or all static constraint files according to type of static constraint.

In block 125, the system may perform an operation at runtime as requested by the user. The operation may be any of the various operations described herein such as timing validation, synthesis, placement, or routing. The operation utilizes the static constraints for the instances of parameterizable modules of the circuit design.

In one example, as part of the operation performed at runtime, the system applies the static constraints. For example, in applying the static constraints, the system may generate a timing graph for each instance of a parameterizable module of the circuit design. The timing graph may specify the static timing constraints as determined values. The timing graph may be stored in program execution memory of the system as a data structure, e.g., in volatile or non-persistent memory (e.g., random access memory or RAM).

FIG. 2 is a flow chart illustrating an exemplary implementation of block 115 of FIG. 1. FIG. 2 illustrates operations that may be applied to significantly reduce runtime of the system when handling constraints for processing parameterizable modules. FIG. 2 illustrates an exemplary method that reduces the number of times operations that may be implemented by the system in performing block 115 are performed, thereby reducing runtime of the system. The exemplary processing described with reference to FIG. 2 may be referred to as constraint caching or one aspect of constraint caching.

In block 205, the system may group instances of parameterizable modules into bins. The system may group the instances of parameterizable modules into bins according to parameter values and module. When processing a circuit design, there is a high likelihood that many instances of a same parameterizable module will have the same parameter values. The system may assign each instance of a same module having same parameter values into a same bin. Thus, each bin will include only instances of a same module having same parameter values. The grouping of instances of parameterizable modules may reduce the runtime of the system as will be described herein in greater detail.

Referring to the example of the xpm_cdc_single parameterizable module, each instance of the xpm_cdc_single parameterizable module having parameter values of MODE=1, DEST_SYNC_FF=8, VERSION="REV1.0", and SRC_INPUT_REG=1 may be assigned to a same bin. In another example, consider the following exemplary instances of parameterizable modules: instance 1 of parameterizable module A, instance 2 of parameterizable module A, instance 3 of parameterizable module A, instance 1 of parameterizable module B, and instance 2 of module parameterizable B. Instance 1 and instance 2 of parameterizable module A may have identical parameter values. Instance 3 of parameterizable module A may have different parameter values. Instances 1 and 2 of parameterizable module B may have different parameter values. In this example, instances 1 and 2 of parameterizable module A are assigned to bin 1. Instance 3 of parameterizable module A and instances 1 and 2 of parameterizable module B are not assigned to bin 1. Each of instance 3 of parameterizable module A and instances 1 and 2 of parameterizable module B are assigned to different bins.

In block 210, the system may select a bin for processing. In block 215, the system may determine the static constraints from the parameterizable constraints for an instance of the parameterizable module in the selected bin. For example, for each parameterizable constraint in the constraint file specified in the CONSTRAINT_FILE attribute, the system executes the program code for the parameterizable constraint using the parameter values of the instance of the parameterizable module and calculates the static constraint. The program code used to specify the parameterizable constraints may include, but is not limited to, expressions and/or logic as may be specified using a scripting language or other programming language. One example of a scripting language that may be used is the Tcl (Tool Command Language).

In block 220, the system may generate a static constraint file for each instance of the parameterizable module in the selected bin. Since each instance of the parameterizable module in the selected bin has same parameters, parameter values, and uses a same constraint file, the static constraint file for each instance will be the same and include the same static constraints therein. Accordingly, rather than continually recalculate the static constraints for each instance of a parameterizable module in a same bin, the system may calculate the static constraints for one instance of a parameterizable module in a bin in block 215 and generate a static constraint file including the calculated static constraints for each instance of the parameterizable module of the bin in block 220. The system may avoid continually reading and parsing the same constraint file over and over again. As such, the system may save significant runtime by effectively calculating the static constraints one time per bin. Each of the resulting static constraint files may be stored in persistent memory in association with the instance of the parameterizable module for that static constraint file.

In block 225, the system determines whether another bin remains to be processed. If so, the method may loop back to block 210 to select a next bin for processing. If not, the method may end. In this example, the system may continue to block 120 of FIG. 1.

Figure 3:
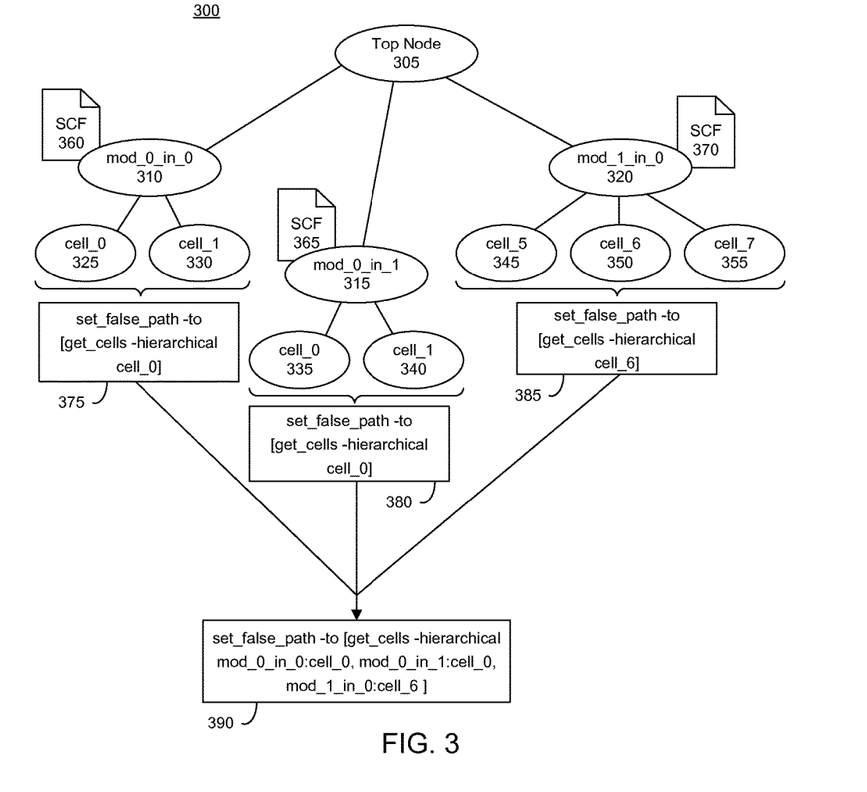
FIG. 3 is a design hierarchy of a circuit design illustrating constraint merging.

FIG. 3 is a design hierarchy of a circuit design 300 illustrating constraint merging. Circuit design 300 includes a top level node 305. In this example, circuit design 300 includes two instances of mod_0 shown as mod_0_in_0 and mod_0_in_1 labeled as nodes 310 and 315, respectively. Circuit design 300 also includes a single instance of mod_1 shown as mod_1_in_0 labeled as node 320. Mod_0_in_0 includes two cells cell_0 and cell_1 labeled nodes 325 and 330, respectively. Mod_0_in_1 includes two cells cell_0 and cell_1 labeled nodes 335 and 340, respectively. Mod_1_in_0 includes three cells cell_5, cell_6, and cell_7 labeled nodes 345, 350, and 355, respectively.

FIG. 3 illustrates the state of circuit design 300 post elaboration. As pictured, mod_0_in_0 is associated with static constraint file (SCF) 360. Mod_0_in_1 is associated with SCF 365. Mod_1_in_0 is associated with SCF 370. For purposes of illustration, consider the case where each of SCF files 360, 365, and 370 includes a "set_false_path" type of static constraint shown as static constraints 375, 380, and 385. In each of static constraints 375, 380, and 385, the particular cells to which the static constraint of an instance is to be applied are noted following "get_cells -hierarchical".

When static constraints are not merged, the system applies the static constraints one by one serially. For example, the system may read a static constraint from SCF 360, then apply the static constraint to the specified cell in this example, read a next static constraint from SCF 360 if any, apply the static constraint to the specified cell(s), and so on until no further static constraints remain to be applied for SCF 360. The system may repeat the process for SCF 365 and then for SCF 370. A significant amount of time is required to continually read a static constraint, apply the static constraint to the timing graph of the relevant instance in program execution memory, and continue as described.

In the case of merging, the system may take one or more static constraints from one or more different instances and combine the static constraints into a single, merged static constraint. In one arrangement, the system may extract the static constraints from SCFs 360, 365, and 370 and create a single list of the constraints. The system may merge static constraints according to type. In the example of FIG. 3, the system may take "set_false_path" static constraints and combine static constraints 375, 380, and 385 into merged static constraint 390 since the static constraints are of a same type. As pictured, merged static constraint 390 specifies each of the cells to which the static constraint is to be applied. The cell may be specified in terms of the design hierarchy so that each cell is associated with a particular instance of a module.

For example, static constraint 375 was to be applied to cell_0 of mod_0_in_0 and is specified as mod_0_in_0: cell_0 in merged static constraint 390. Static constraint 380 was to be applied to cell_0 of mod_0_in_1 and is specified as mod_0_in_1:cell_0 in merged static constraint 390. Static constraint 385 was to be applied to cell_6 of mod_1_in_0 and is specified as mod_1_in_0:cell_6 in merged static constraint 390.

By merging the static constraints into a single larger constraint, the runtime for applying the constraints to the timing graphs may be significantly reduced. Post merge, the system may apply merged static constraint 390 across all applicable objects. In this example, the system may apply merged static constraint 390 to each of the enumerated cells which may span across multiple instances of a same parameterizable module and/or across multiple different instances of different modules. Whereas prior to merging, application of multiple constraints required multiple calls, post merge, the application of multiple constraints may require a single call. The end result is still that the static constraints are applied to the timing model of each instance of circuit design 300 in program execution memory, albeit in less time due to the reduced number of operations performed. The system no longer needs to retrieve a single constraint, apply the constraint, and retrieve a next constraint. Instead, the system may retrieve a merged static constraint, and apply the merged static constraint to a plurality of objects of circuit design 300.

Application of constraint caching and constraint merging as described within this disclosure may provide significant reduction in runtime for a system. In one exemplary case, a circuit design with 6,400 parameterizable modules was processed using constraint caching and constraint merging. Each parameterizable module had one parameterizable constraint. Conventional techniques for processing the constraints required approximately 2,694 seconds. When applying constraint caching and constraint merging as described herein, runtime was reduced to approximately 29 seconds.

Figure 4:
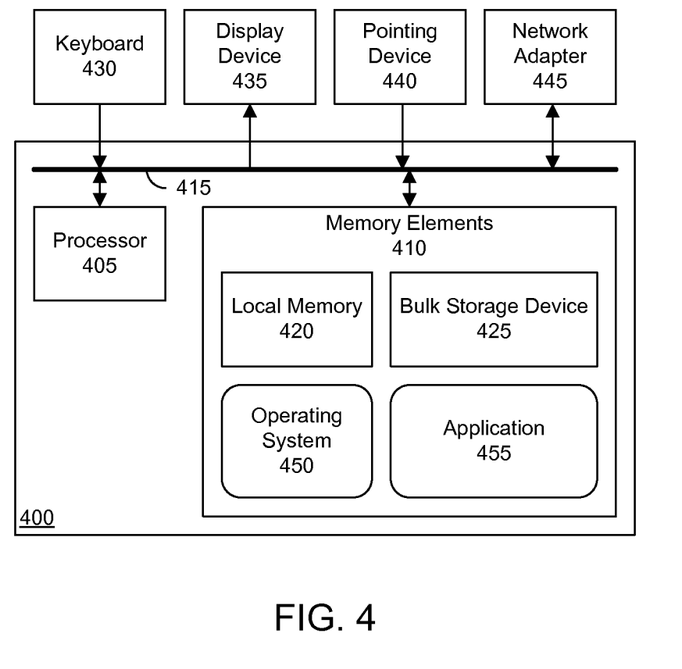
FIG. 4 is a block diagram illustrating an exemplary data processing system.

FIG. 4 is a block diagram illustrating an exemplary data processing system (system) 400. System 400 may be used to perform the various operations described herein including the methods illustrated by way of example in FIGS. 1, 2, and 3.

As pictured, system 400 includes at least one processor, e.g., a central processing unit (CPU), 405 coupled to memory elements 410 through a system bus 415 or other suitable circuitry. System 400 stores computer readable instructions (also referred to as "program code") within memory elements 410. Processor 405 executes the program code accessed from memory elements 410 via system bus 415.

Memory elements 410 may include one or more physical memory devices such as, for example, a local memory 420 and one or more bulk storage devices 425. Local memory 420 refers to RAM or other non-persistent memory device(s) generally used during actual execution of the program code. Bulk storage device 425 may be implemented as a hard disk drive (HDD), solid state drive (SSD), or other persistent data storage device. System 400 may also include one or more cache memories (not shown) that provide temporary storage of at least some program code in order to reduce the number of times program code must be retrieved from bulk storage device 425 during execution.

Input/output (I/O) devices such as a keyboard 430, a display device 435, a pointing device 440, and one or more network adapters 445 may be coupled to system 400. The I/O devices may be coupled to system 400 either directly or through intervening I/O controllers. In some cases, one or more of the I/O devices may be combined as in the case where a touchscreen is used as display device 435. In that case, display device 435 may also implement keyboard 430 and pointing device 440. Network adapter 445 may be used to couple system 400 to other systems, computer systems, remote printers, and/or remote storage devices through intervening private or public networks. Modems, cable modems, Ethernet cards, and wireless transceivers and/or radios are examples of different types of network adapter 445 that may be used with system 400. Depending upon the particular implementation of system 400, the specific type of network adapter, or network adapters as the case may be, will vary.

As pictured in FIG. 4, memory elements 410 may store an operating system 450 and one or more applications 455. Application 455, for example, may be an EDA application. In one aspect, operating system 450 and application 455, being implemented in the form of executable program code, are executed by system 400 and, in particular, by processor 405. As such, operating system 450 and application 455 may be considered an integrated part of system 400. Operating system 450, application 455, and any data items used, generated, and/or operated upon by system 400 are functional data structures that impart functionality when utilized by system 400.

In one aspect, system 400 may be a computer or other device that is suitable for storing and/or executing program code. System 400 may represent any of a variety of computer systems and/or devices that include a processor and memory and that are capable of performing the operations described within this disclosure. In some cases, the particular computer system and/or device may include fewer components or more components than described. System 400 may be implemented as a single system as shown or as a plurality of networked or interconnected systems each having an architecture the same as, or similar to, that of system 400.

The inventive arrangements described within this disclosure provide various advantages over conventional techniques for handling constraints. In one aspect, for example, no additional design steps are needed for the generation of constraint files where sets of parameter values are provided by the user on a per parameterizable module instance basis. Parameter values may be extracted from the parameterizable modules. Constraint files may be evaluated with the extracted parameters to create the constraints appropriate for each particular instance of the design. This process is performed automatically by the system thereby reducing complexity, facilitating easier instantiation of modules within a circuit design, and increasing user productivity.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se, e.g., is non-transitory. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of constraint handling for a circuit design may include determining, using a processor, instances of parameterizable modules of a circuit design associated with constraints based upon a predefined HDL attribute within the instances, extracting, using the processor, parameter values from the instances of the parameterizable modules, and generating, using the processor, static constraint files for the instances of the parameterizable modules using the extracted parameter values.

The method may include grouping the instances of the parameterizable modules into bins wherein each bin includes instances of a same parameterizable module having same parameter values.

In one aspect, generating static constraint files for the instances of the parameterizable modules may be performed by bin and may include, for at least one selected bin, calculating static constraints from parameterizable constraints for a single instance of a parameterizable module of the selected bin and creating a static constraint file for each instance of the parameterizable module of the selected bin using the calculated static constraints.

The method may include applying static constraints from the static constraint files to the plurality of instances of the at least one parameterizable module.

In another arrangement, the method may include merging static constraints from selected static constraint files of a plurality of instances of at least one parameterizable module into a merged static constraint and applying the merged static constraint to the plurality of instances of the at least one parameterizable module. Applying the merged static constraint to the plurality of instances of the at least one parameterizable module may include creating, within program execution memory, a timing data structure specifying the merged static constraint for each instance of the plurality of instances of the at least one parameterizable module.

The method may also include inserting the predefined HDL attribute within the instances of the parameterizable modules of the circuit design.

Determining instances of parameterizable modules of a circuit design may include searching instances of modules of the circuit design for the predefined HDL attribute specifying a constraint file for the module.

The constraint file may include a parameterizable constraint evaluated at runtime, wherein the parameterizable constraint for a selected instance of a parameterizable module depends upon a parameter value from the selected instance of the parameterizable module. The parameterizable constraint may be specified using a scripting language.

A non-transitory computer-readable storage medium may include instructions stored thereon which, when executed by a processor, perform a method of constraint handling for a circuit design. The method may include determining, using a processor, instances of parameterizable modules of a circuit design associated with constraints based upon a predefined HDL attribute within the instances, extracting, using the processor, parameter values from the instances of the parameterizable modules, and generating, using the processor, static constraint files for the instances of the parameterizable modules using the extracted parameter values.

The method may include grouping the instances of the parameterizable modules into bins wherein each bin includes instances of a same parameterizable module having same parameter values.

In one aspect, generating static constraint files for the instances of the parameterizable modules may be performed by bin and may include, for at least one selected bin, calculating static constraints from parameterizable constraints for a single instance of a parameterizable module of the selected bin and creating a static constraint file for each instance of the parameterizable module of the selected bin using the calculated static constraints.

The method may include applying static constraints from the static constraint files to the plurality of instances of the at least one parameterizable module.

In another arrangement, the method may include merging static constraints from selected static constraint files of a plurality of instances of at least one parameterizable module into a merged static constraint and applying the merged static constraint to the plurality of instances of the at least one parameterizable module. Applying the merged static constraint to the plurality of instances of the at least one parameterizable module may include creating, within program execution memory, a timing data structure specifying the merged static constraint for each instance of the plurality of instances of the at least one parameterizable module.

The method may also include inserting the predefined HDL attribute within the instances of the parameterizable modules of the circuit design.

Determining instances of parameterizable modules of a circuit design may include searching instances of modules of the circuit design for the predefined HDL attribute specifying a constraint file for the module.

The constraint file may include a parameterizable constraint evaluated at runtime, wherein the parameterizable constraint for a selected instance of a parameterizable module depends upon a parameter value from the selected instance of the parameterizable module. The parameterizable constraint may be specified using a scripting language.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of constraint handling for a circuit design, comprising:
   determining, using a processor, instances of parameterizable modules of a circuit design associated with constraints based upon a predefined hardware description language attribute within the instances;
   extracting, using the processor, parameter values from the instances of the parameterizable modules; and
   generating, using the processor, static constraint files for the instances of the parameterizable modules using the extracted parameter values.

2. The method of claim 1, further comprising:
   grouping the instances of the parameterizable modules into bins wherein each bin includes instances of a same parameterizable module having same parameter values.

3. The method of claim 2, wherein generating static constraint files for the instances of the parameterizable modules is performed by bin and comprises, for at least one selected bin:

calculating static constraints from parameterizable constraints for a single instance of a parameterizable module of the selected bin; and creating a static constraint file for each instance of the parameterizable module of the selected bin using the calculated static constraints.

4. The method of claim 1, further comprising:

applying static constraints from the static constraint files to the plurality of instances of the at least one parameterizable module.

5. The method of claim 1, further comprising:

merging static constraints from selected static constraint files of a plurality of instances of at least one parameterizable module into a merged static constraint; and applying the merged static constraint to the plurality of instances of the at least one parameterizable module.

6. The method of claim 5, wherein applying the merged static constraint to the plurality of instances of the at least one parameterizable module comprises:

creating, within program execution memory, a timing data structure specifying the merged static constraint for each instance of the plurality of instances of the at least one parameterizable module.

7. The method of claim 1, further comprising:

inserting the predefined hardware description language attribute within the instances of the parameterizable modules of the circuit design.

8. The method of claim 1, wherein determining instances of parameterizable modules of a circuit design comprises:

searching instances of modules of the circuit design for the predefined hardware description language attribute specifying a constraint file for the module.

9. The method of claim 1, wherein the constraint file comprises a parameterizable constraint evaluated at runtime, wherein the parameterizable constraint for a selected instance of a parameterizable module depends upon a parameter value from the selected instance of the parameterizable module.

10. The method of claim 9, wherein the parameterizable constraint is specified using a scripting language.

11. A non-transitory computer-readable storage medium having instructions stored thereon which, when executed by a processor, perform a method of constraint handling for a circuit design comprising:

determining, using the processor, instances of parameterizable modules of a circuit design associated with constraints based upon a predefined hardware description language attribute within the instances;

extracting, using the processor, parameter values from the instances of the parameterizable modules; and generating, using the processor, static constraint files for the instances of the parameterizable modules using the extracted parameter values.

12. The non-transitory computer-readable storage medium of claim 11, further comprising:

grouping the instances of the parameterizable modules into bins wherein each bin includes instances of a same parameterizable module having same parameter values.

13. The non-transitory computer-readable storage medium of claim 12, wherein generating static constraint files for the instances of the parameterizable modules is performed by bin and comprises, for at least one selected bin:

calculating static constraints from parameterizable constraints for a single instance of a parameterizable module of the selected bin; and creating a static constraint file for each instance of the parameterizable module of the selected bin using the calculated static constraints.

14. The non-transitory computer-readable storage medium of claim 11, further comprising:

applying static constraints from the static constraint files to the plurality of instances of the at least one parameterizable module.

15. The non-transitory computer-readable storage medium of claim 11, further comprising:

merging static constraints from selected static constraint files of a plurality of instances of at least one parameterizable module into a merged static constraint; and applying the merged static constraint to the plurality of instances of the at least one parameterizable module.

16. The non-transitory computer-readable storage medium of claim 15, wherein applying the merged static constraint to the plurality of instances of the at least one parameterizable module comprises:

creating, within program execution memory, a timing data structure specifying the merged static constraint for each instance of the plurality of instances of the at least one parameterizable module.

17. The non-transitory computer-readable storage medium of claim 11, further comprising:

inserting the predefined hardware description language attribute within the instances of the parameterizable modules of the circuit design.

18. The non-transitory computer-readable storage medium of claim 11, wherein determining instances of parameterizable modules of a circuit design comprises:

searching instances of modules of the circuit design for the predefined hardware description language attribute specifying a constraint file for the module.

19. The non-transitory computer-readable storage medium of claim 11, wherein the constraint file comprises a parameterizable constraint evaluated at runtime, wherein the parameterizable constraint for a selected instance of a parameterizable module depends upon a parameter value from the selected instance of the parameterizable module.

20. The non-transitory computer-readable storage medium of claim 19, wherein the parameterizable constraint is specified using a scripting language.

* * * * *